United States Patent [19]
Koizumi et al.

[11] Patent Number: 4,745,242
[45] Date of Patent: May 17, 1988

[54] COORDINATE INPUT SHEET WITH CORRECTION ELECTRODES

[75] Inventors: Haruyuki Koizumi, Kyoto; Shinichi Hashizume, Kasatsu; Koichi Omae, Kyoto; Sanji Nakabayashi, Mishima, all of Japan

[73] Assignee: Omron Tateisi Electronics Co., Kyoto, Japan

[21] Appl. No.: 12,154

[22] Filed: Feb. 9, 1987

[30] Foreign Application Priority Data

Feb. 10, 1986 [JP] Japan ................................. 61-27087
Feb. 10, 1986 [JP] Japan ................................. 61-27088

[51] Int. Cl.4 ............................................. G08C 21/00
[52] U.S. Cl. .................................................... 178/18
[58] Field of Search ............................. 178/18, 19, 20; 338/121

[56] References Cited
U.S. PATENT DOCUMENTS 4,080,514 3/1978 Pobgee ............................ 178/19 X Primary Examiner—Stafford D. Schreyer
Attorney, Agent, or Firm—Stevens, Davis, Miller & Mosher

[57] ABSTRACT

A coordinate input sheet for use in a coordinate digitizer apparatus has at least one auxiliary electrode disposed between and in parallel with main electrodes provided at opposite ends of a resistance surface. The auxiliary electrode is used to either measure a voltage at its respective position which can be used to correct point contact data generated by said sheet or to apply a voltage to said sheet so that point data generated by said sheet is correct.

7 Claims, 5 Drawing Sheets

FIG. I
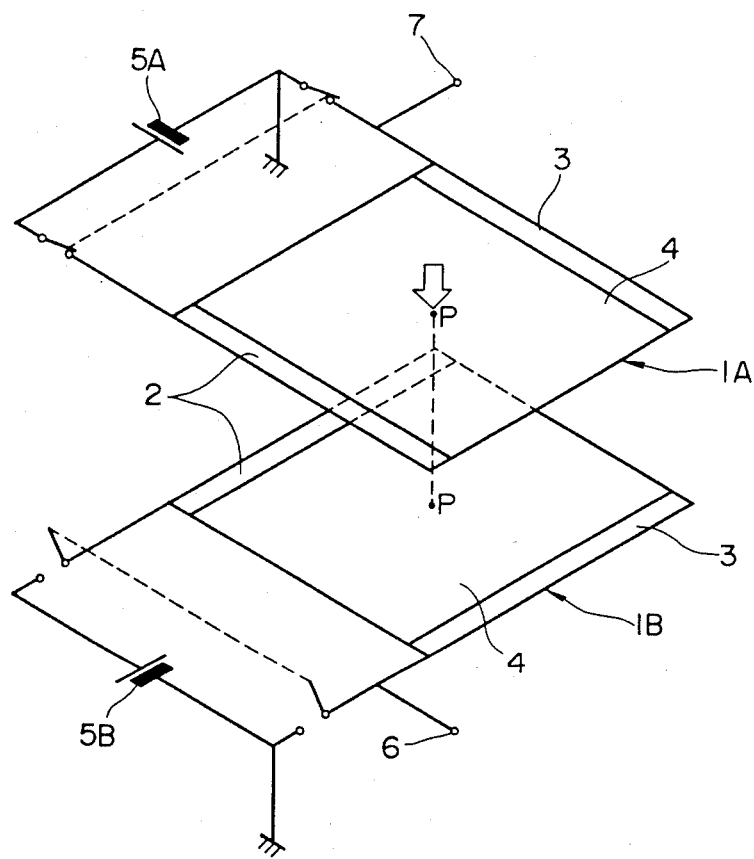
FIG. 2
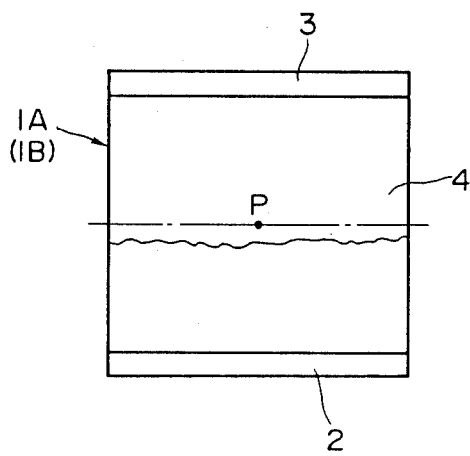

COORDINATE INPUT SHEET WITH CORRECTION ELECTRODES

BACKGROUND OF THE INVENTION

1. Field of the Invention

This invention relates to a coordinate input sheet used to specify respective coordinate input data especially when a figure is input to a computer in a so-called digitizer as an input device for written letters and figures, or when a partial area of print matter is designated and copied by a copy machine.

2. Discussion of the Prior Art

A conventional digitizer is shown in FIG. 1, which includes two coordinate input sheets 1A, 1B, each of which includes an insulating sheet and opposing electrodes 2, 3 each being disposed at a corresponding end of the insulating sheet. A surface resistor 4 is formed between the electrodes and the sheets 1A, 1B overlap so that the respective interelectrode directions are arranged at 90 degrees with respect to one another. The lower coordinate input sheet 1B is used, for example, for detecting the X-axis coordinate position of a stylus press point to be described below, while the upper coordinate input sheet 1A is used for detecting the Y-axis coordinate position.

In more detail, when any particular point on input sheet 1A is pressed in FIG. 1 and a voltage 5A is applied across the sheet 1A, a division of voltage at the point P on sheet 1A occurs and is taken as the X-axis coordinate position data from a division voltage output terminal 6 of the lower coordinate input sheet 1B. Next, by application of a voltage 5B to lower coordinate input sheet 1B, the division voltage at point P on the sheet 1B is taken as the Y-axis coordinate position data from a division voltage output terminal 7 of the upper coordinate input sheet 1A. Thus, this time-division switching operation between sheets 1A and 1B provides the X-Y coordinates of the point P where the slytus pressure is applied.

The division voltage at the input point P on the upper coordinate input sheet 1A will now be considered in greater detail. So long as the linearity of the surface resistance 4 between electrodes 2 and 3 is maintained, the division voltage at the press input point P exhibits a value inversely proportional to the distance from positive electrode 2. For example, if the inter-electrode voltage is, for example 5 V and if the point P is at the middle point between electrodes 2 and 3, a value of 2.5 V is exhibited.

However, in fact, the surface resistance 4 is affected by many factors, such as uneven printing or the like and does not exhibit a perfect resistance linearity. Thus the above 2.5 V midpoint line deviates across the coordinate input sheet as shown by a curved line in FIG. 2, from the rightfull position shown by a dot-dashed line so that even if the operator has pressed the midpoint correctly, incorrect coordinate data is often obtained. This applies likewise to lower coordinate input sheet 1B.

SUMMARY OF THE INVENTION

It is an object of this invention to provide a coordinate input sheet which has one or more auxiliary electrodes disposed between and in parallel with the main coordinate digitizing electrodes, which can be used to acquire, for storage in a digitizer, data representing variations in the surface resistance of a coordinate input sheet to be used. This data representing the variations can then be used to correct the error between the actual pressed input point P and the output coordinate data, so that the pressed input point coordinate data can be correctly fed into a computer or other device.

Another object of the invention is the provision of a coordinate digitizer system for use in conjunction with the just-described coordinate input sheet to acquire and store data representing variations in the surface resistance of the coordinate input sheet which data is then used when an input point is pressed to correct the coordinate data representing the pressed point.

Another object of the invention is the provision of a coordinate input sheet which has one or more auxiliary electrodes disposed between and in parallel with the main coordinate digitizing electrodes for receiving a voltage for cancelling voltage errors produced by the variations in the surface resistance of the input sheet.

In one embodiment, the invention is characterized in that a coordinate input sheet has one or more stripe-like auxiliary electrodes disposed between and in parallel with the opposing main electrodes 2, 3, for generating voltages when a reference voltage is applied to the main electrodes, which voltages represent variations in the surface resistance of the input sheet. The voltages are detected and stored as data and used to correct coordinate data actually acquired during use of the input sheet.

In another embodiment, the invention is further characterized in that a coordinate input sheet has opposing main electrodes and one or more stripe-like auxiliary electrodes disposed between and parallel to the main electrodes on a surface resistance portion between the opposing electrodes. A voltage set in accordance with the positions of the auxiliary electrodes is applied to the auxiliary electrodes to correct for variations in surface resistance of the sheet.

According to the first embodiment of the invention, the voltages at one or more auxiliary electrodes, acting as correction electrodes are measured before the actual use of the coordinate input sheet, the position (distance) occupied by these correction electrodes between the opposing electrodes and the measured value of the potential are compared to read a deviation (error) in the resistance value of the surface resistance. Consequently, if data is derived representing this error and is previously stored as correction data in the digitizer, it can be used to compensate for and correct the pressed input point coordinate data output from the coordinate input sheet. As a result, variations in the surface resistance of the sheet are compensated for in a digitizer, the linearity of the surface resistance is improved, and the pressed input point coordinates can be input correctly to a computer or other device.

According to a second embodiment of the invention, if the linearity of the surface resistance of the coordinate input sheet is damaged, for example, if a deficit voltage such as 2.3 V would at the middle point between the opposing electrodes although a potential of 2.5 V should naturally be obtained, a voltage to cancel the shortage is applied from the auxiliary electrodes to thereby eliminate a deviation (error) in the resistance value of the surface resistance, and to improve the linearity so that corrected coordinate data of a pressed point are fed to a computer or other device.

Other objects and advantages of the invention will be more readily understood from the following detailed description of the invention which is provided in connection with the accompanying drawings.

BRIEF DESCRIPTION OF THE DRAWING

FIG. 1 is a diagramatic view explaining the detection principle of a digitizer using a prior art coordinate input sheet;

FIG. 2 is a plan view of the coordinate input sheet of FIG. 1;

DETAILED DESCRIPTION OF THE INVENTION

Figure 3:
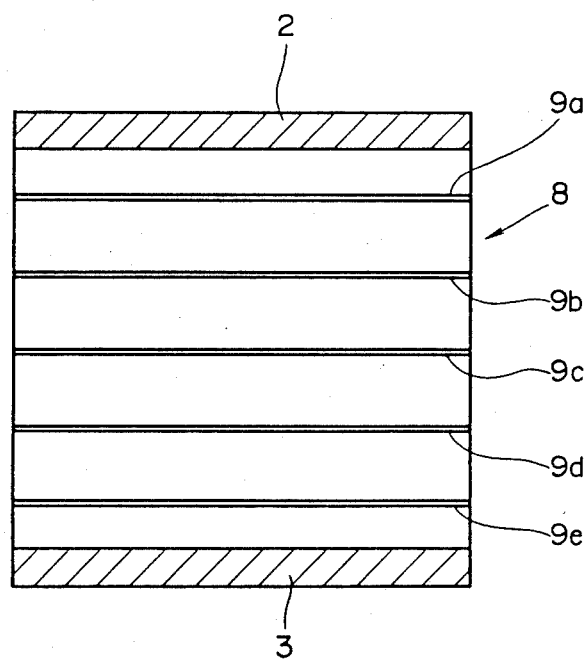
FIG. 3 is a front view of a first embodiment of a coordinate input sheet constructed in accordance with the invention.

A first embodiment of this invention will now be described with reference to FIGS. 3 and 4. It is to be noted that in this particular embodiment the same components as in FIG. 1 are similarly given the same reference numerals.

FIG. 3 shows a coordinate input sheet 8 according to this invention in which stripe-like auxiliary electrodes 9a–9e are disposed at appropriate spacings so as to be parallel to electrodes 2, 3 on the effective area portion of the surface resistance 4. In FIG. 3, five correction electrodes are provided, but a different number of such electrodes may be provided. The auxiliary electrodes 9a–9e only read a potential as described later, and they may be thin.

Figure 4:
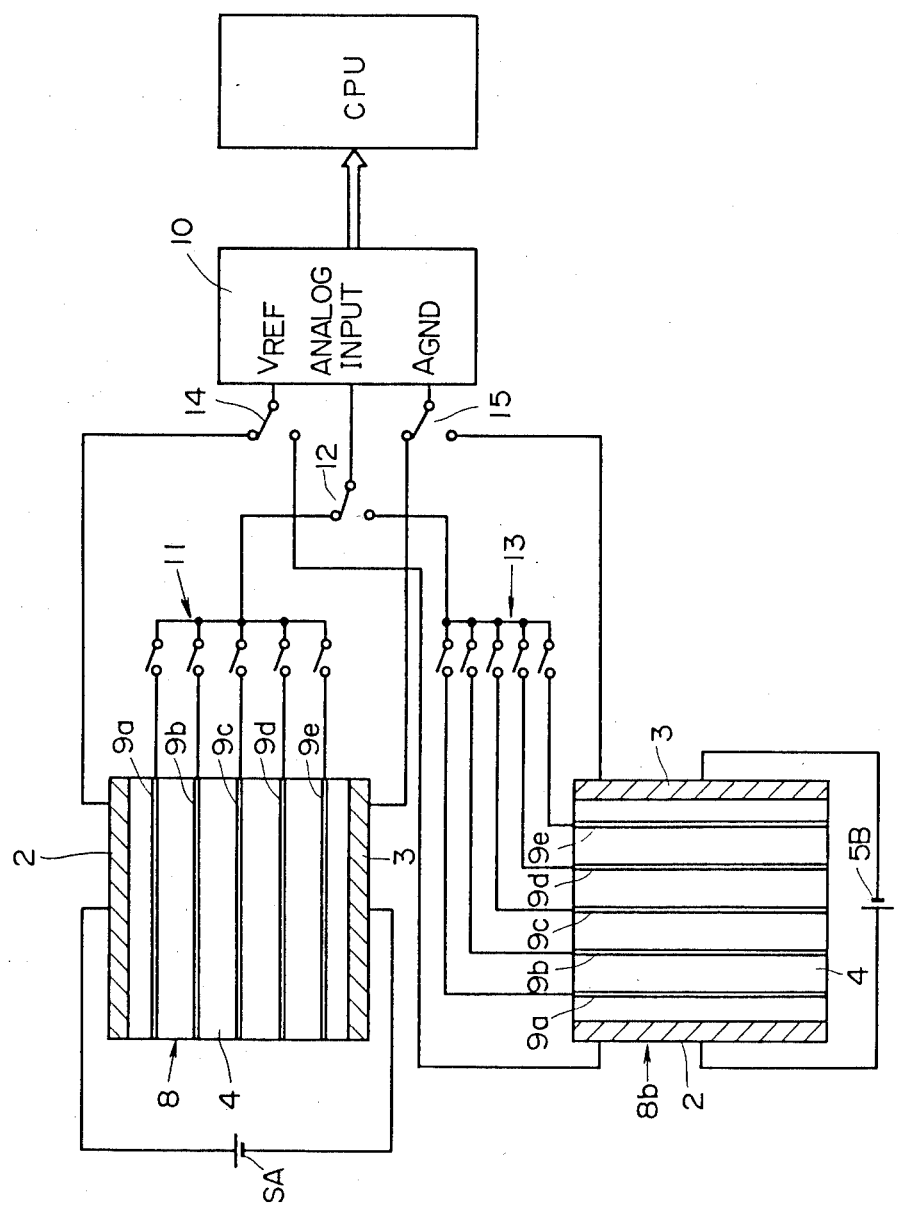
FIG. 4 is a schematic showing an example used wherein two coordinate input sheets in FIG. 3 are connected to a digitizer.

FIG. 4 shows that two coordinate input sheets having the above structure are used for upper and lower coordinate input sheets 8A and 8B which are connected to a digitizer analog-to-digital (A/D) converter 10, and a central processing unit CPU.

In FIG. 4, before actual use of the respective sheets 8A, 8B, the voltages of the correction electrodes 9a–9e are individually measured. Thus, as shown, the auxiliary electrodes 9a–9e of the upper coordinate input sheet 8A are connected via a group of switches 11 to analog input terminals of an A/D converter 10 and a voltage SA is applied across both electrodes 2, 3. The switches 11 are then switched on one by one to feed the respective potentials of the correction electrodes 9a–9e to A/D converter 10. Since the positions of respective correction electrodes 9a–9e between the electrodes 2, 3 are fixed and thus known, the respective potentials are written into CPU as digital data using the electrode positions as addresses and are then stored in a memory. Next, a selector switch 12 is switched to cause a similar storage operation to be performed on the lower coordinate input sheet 8B using a group of switches 13.

When the above is completed, all the contacts of the switch groups 11, 13 are switched off to disconnect the analog input terminals from the auxiliary electrodes 9a–9e and the coordinate input sheets 8A and 8B are ready for contact operations such as stylus inputting.

In this case, X-Y changeover switches 14, 15 are switched between input sheets 8A and 8B to take the X-axis coordinate positions from lower coordinate input sheet 8B and the Y-axis coordinate position from the upper coordinate input sheet 8A, and these positions are delivered via A/D converter 10 to the CPU.

The CPU corrects the newly input X- and Y-axis point contact input coordinate data using the stored potentials and positions of correction electrodes 9a–9e, calculates the actually pressed position, and sends this as a coordinate point signal to a computer or other device (not shown).

As described above, according to this first embodiment of the invention, the potentials of auxiliary electrodes 9a–9e are stored as data for correction processing in accordance with the previously used individual coordinate input sheets 8A, 8B. The stored data is used to correct the press point coordinates at the CPU to obtain corrected press point coordinates.

A second embodiment of this invention will next be described with reference to FIGS. 5–8. It is to be noted that the same components of this embodiment as in FIGS. 1–4 are given the same reference numerals.

Figure 5:
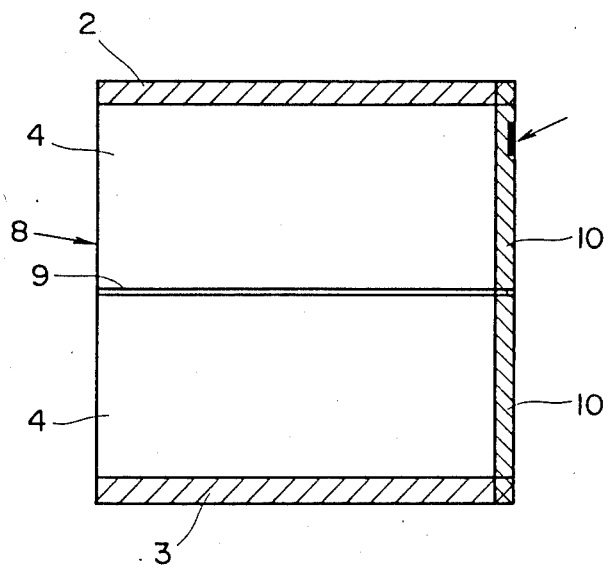
FIG. 5 is a plan view showing a second embodiment of a coordinate input sheet constructed in accordance with the invention.

In a coordinate input sheet 8 shown in FIG. 5, a stripe-like auxiliary electrode 9 is disposed parallel to main electrodes 2, 3 on a surface resistance 4 portion between electrodes 2, 3. This auxiliary electrode 9 is connected to an auxiliary resistor (which will be an adjustable resister as discussed below) 10 printed at one end of the sheet. Resistor 10 is also connected to electrodes 2, 3.

Thus, if a voltage is applied across electrodes 2, 3, a voltage is also applied via resistor 10 to auxiliary electrode 9. Prior to use of the coordinate input sheet 8, the potential at the position corresponding to auxiliary electrode 9 is previously measured by other measurement devices. If the potential at this position is different from a designed potential, laser trimming is performed on auxiliary resistor 10, as shown by the arrow in FIG. 5. As a result, the value of auxiliary resistor 10 is changed, and the voltage applied to auxiliary electrode 9 is corrected to obtain the designed potential.

Figure 6:
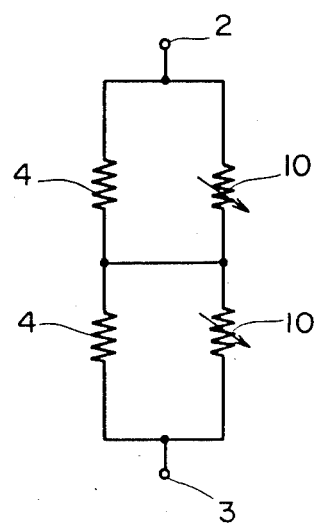
FIG. 6 is a diagram of an equivalent circuit of FIG. 5.

It will be clearly understood that the coordinate input sheet 8 depicted in FIG. 5 has the equivalent circuit shown in FIG. 6 wherein auxiliary resistor 10 serves as a variable resistor which is adjusted for potential adjustment. This improves the non-linearity of potential distribution on surface resistor 4 due to uneven printing of the surface resistance 4 or other defects.

The portions where the resistance is adjusted by laser trimming are not limited to those shown and are selected in accordance with the positions where the linearity of the surface resistance fails. Also, the position where the auxiliary electrode 9 is disposed and the number of auxiliary electrodes 9 used are not limited.

Figure 7:
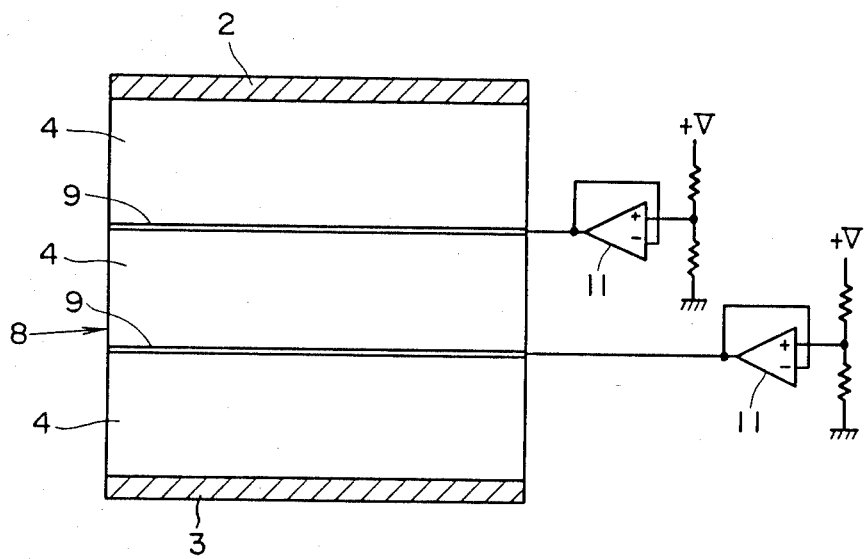
FIG. 7 is a plan view of an embodiment in which the auxiliary resistor of FIG. 5 is replaced by an operational amplifier; and, FIG. 8 is a plan view of a modification of the second embodiment of the invention where the auxiliary resistor of FIG. 5 is replaced by an external resistor.

FIG. 7 shows a modification of the FIG. 5 embodiment which uses two auxiliary electrodes 9 to which an external source of power applies a respective set voltage to each electrode 9 via an operational amplifier 11 instead of the auxiliary resistor 10 used in FIG. 5. The set voltages are selected to produce a correctly designed coordinate voltage at those portions of the resistance sheet 4 where the electrodes 9 reside.

Figure 8:
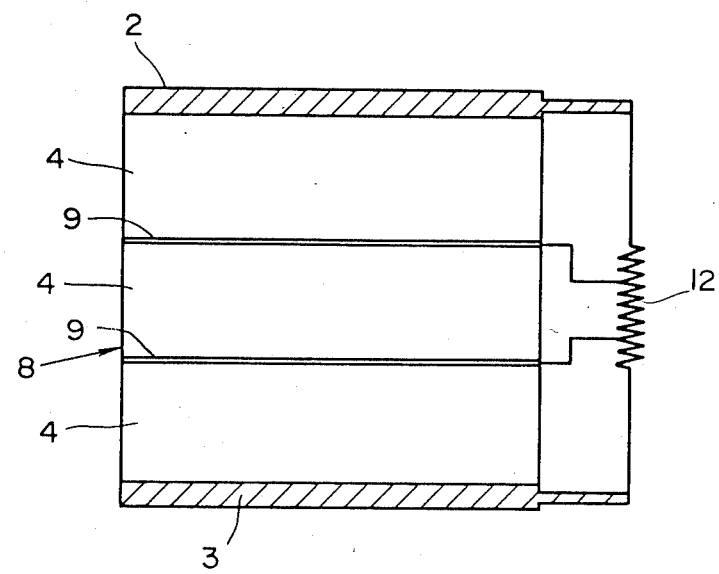

FIG. 8 shows another modification of the second embodiment wherein an external resistor 12 is connected to electrodes 2, 3 with the division voltage from the external resistor 12 being applied to the auxiliary electrodes 9.

As described above, according to the second embodiment of the invention shown in FIGS. 5–8, the nonlinearity of a potential distribution on the surface resistance 4 is improved by application of a voltage to auxiliary electrodes 9 to correct for voltage derivations produced by such non-linearity, so that the coordinate output voltage from a pressed input point is correct.

Although various embodiments of the invention have been shown and described, the drawings and description are not limiting of the invention as many modifications can be made without departing from the spirit and scope of the invention. Accordingly, the invention is not limited by the foregoing description, but is only limited by the scope of the claims appended hereto.

We claim:

1. A coordinate input sheet used for coordinate digitizing and comprising main electrodes disposed at a predetermined spacing in parallel on an insulating sheet, a surface resistance on the sheet between said main electrodes, at least one stripe-like auxiliary electrode disposed between and in parallel with said main electrodes on said surface resistance portion of said sheet, and means for applying a voltage to each of said auxiliary electrodes, said voltage being set in accordance with the positions of said auxiliary electrodes on said sheet and a designed voltage to be detected at said positions during coordinate digitizing use of said coordinate input sheet, said applying means comprising a resistance provided between each said auxiliary electrode and said main electrodes, which has a value adjusted to provide said designed voltage.

2. A coordinate input sheet as in claim 1, wherein said resistance is a resistance printed on said input sheet.

3. A coordinate input sheet as in claim 2, wherein said resistance is printed on a side edge of said sheet between said main electrodes.

4. A coordinate input sheet as in claim 1, wherein said resistance is connected externally between main electrodes and each said auxiliary electrode is connected to a respective tap point of said resistance.

5. A coordinate digitizer system comprising:
first and second coordinate input sheets, each comprising main electrodes disposed at a predetermined spacing in parallel on an insulating sheet, a surface resistance provided on said sheet between said main electrodes, and, at least one stripe-like auxiliary electrode provided on said surface resistance portion of said sheet and arranged between and in parallel with said main electrodes, said input sheets overlapping one another;
means for applying a voltage across the main electrodes of each of said sheets;
means for storing data representing the voltages present at each of said auxiliary electrodes due to the voltage applied to the main electrodes;
means for detecting the coordinate of a pressed point applied to said sheets; and
means for correcting the detected coordinates of said pressed point with said stored data representing the voltages present at said auxiliary electrodes.

6. A coordinate input sheet used for coordinate digitizing and comprising:
main electrodes disposed at a predetermined spacing in parallel on an insulating sheet;
a surface resistance on the sheet between said main electrodes;
at least one stripe-like auxiliary electrode disposed between and in parallel with said main electrodes on said surface resistance portion of said sheet, and
means for applying a voltage to each of said auxiliary electrodes, said voltage being set in accordance with the positions of said auxiliary electrodes on said sheet and a designed voltage to be detected at said positions during coordinate digitizing use of said coordinate input sheet, said applying means comprising respective voltage sources which are connected to each of said auxiliary electrodes.

7. A coordinate input sheet as in claim 6, further comprising an operational amplifier for connecting each said voltage source to a respective auxiliary electrode.

* * * * *